(12) United States Patent
Taguchi et al.

(10) Patent No.: US 6,585,321 B1
(45) Date of Patent: Jul. 1, 2003

(54) SEAT ADJUSTER FOR VEHICLE SEAT

(75) Inventors: Masayuki Taguchi, Akishima (JP); Yoshihiro Okamoto, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 75 days.

(21) Appl. No.: 09/722,394

(22) Filed: Nov. 28, 2000

(51) Int. Cl.[7] .................................. A47C 7/02
(52) U.S. Cl. ................. 297/344.1; 297/452.38
(58) Field of Search ............ 297/344.1, 452.38, 297/463.1, 463.2; 248/429, 430

(56) References Cited

U.S. PATENT DOCUMENTS

| | | | | |
|---|---|---|---|---|
| 1,383,077 A | * | 6/1921 | Cole |
| 1,979,860 A | * | 11/1934 | Browne |
| 2,612,208 A | * | 9/1952 | Rhodes |
| 3,469,812 A | * | 9/1969 | Wonell et al. |
| 4,784,434 A | * | 11/1988 | Iwami |
| 5,007,682 A | * | 4/1991 | Kuwabara et al. |
| 5,039,166 A | * | 8/1991 | Kojho |
| 5,228,659 A | * | 7/1993 | Potes, Jr. et al. |
| 5,348,261 A | * | 9/1994 | Nini |
| 5,718,478 A | * | 2/1998 | Allison |
| 5,833,313 A | * | 11/1998 | Kaneda et al. |
| 6,036,267 A |   | 3/2000 | Downey et al. |

* cited by examiner

*Primary Examiner*—Milton Nelson, Jr.
(74) *Attorney, Agent, or Firm*—Browdy and Neimark

(57) ABSTRACT

A seat adjustment device or seat adjuster for use with a vehicle seat is provided with a flap- or plate-like operation lever. The plate-like operation lever is pivotally arranged below a forward end of seat cushion of the vehicle seat such as to be normally dependent therefrom. Hence, the lever itself assumes a decorative cover as if it was an integral part of the vehicle seat and also effectively covers a lower objectionable portion below the seat cushion.

10 Claims, 2 Drawing Sheets

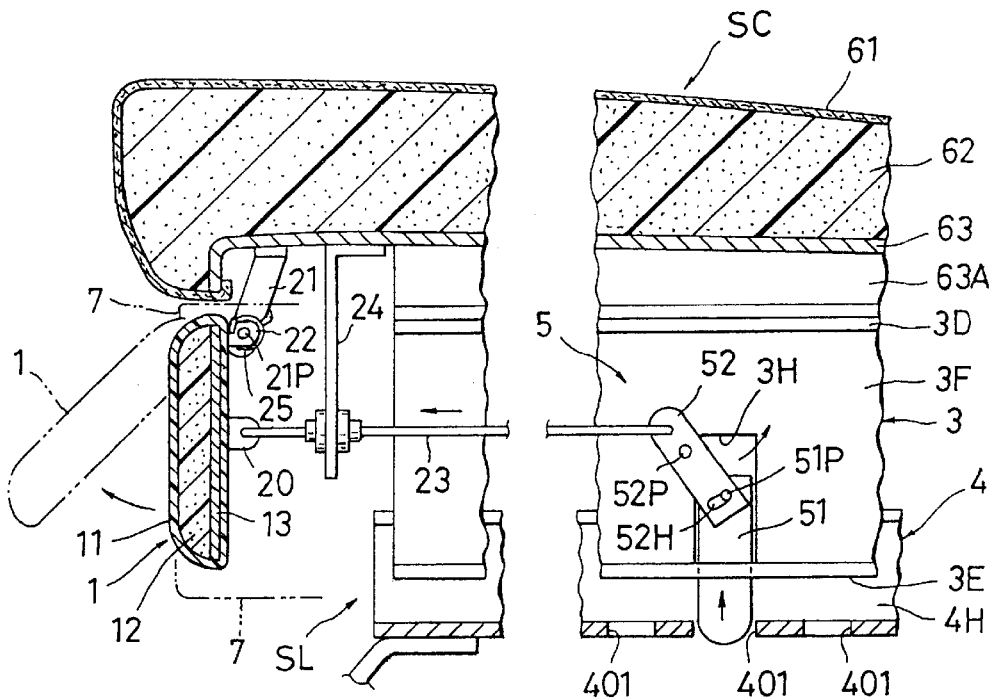
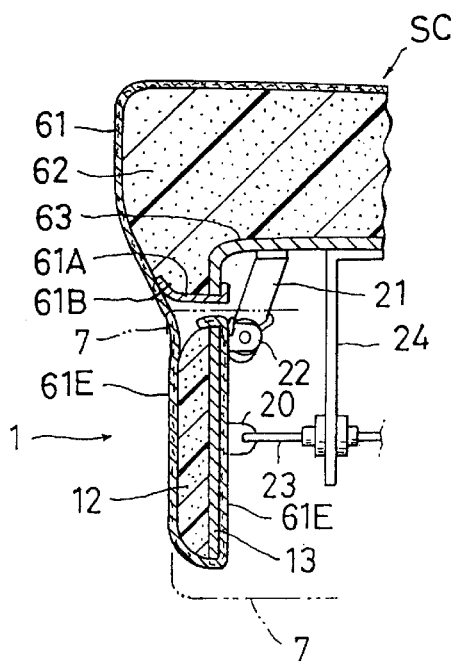
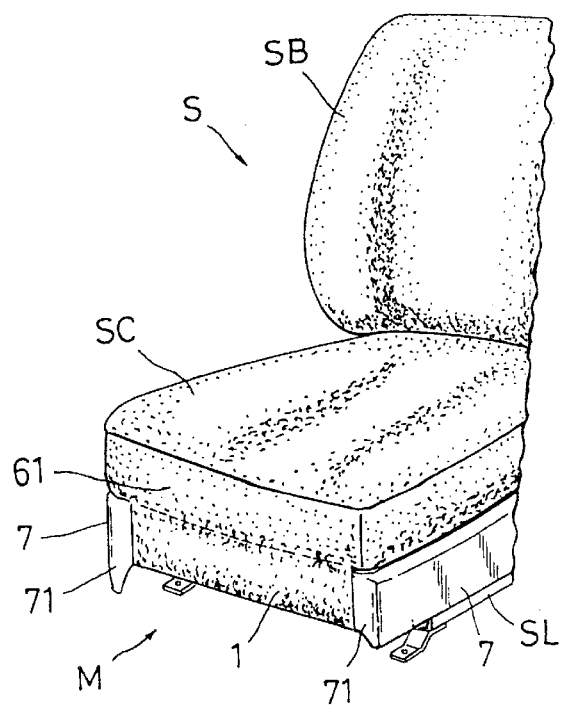

SEAT ADJUSTER FOR VEHICLE SEAT

BACKGROUND OF INVENTION

1. Field of the Invention

The present invention relates to a device for adjustment in position of vehicle or automotive seat in the fore-and-aft direction thereof (the so-called seat adjuster), and in particular to an operation lever for locking and unlocking such seat adjustment device or seat adjuster.

2. Description of Prior Art

Generally, automotive and vehicle seats are each equipped with a seat adjustment device or what is called "seat adjuster" to enable an occupant on the seat to selectively adjust the position of seat in the fore-and-aft direction thereof according to his or her seating preferences and conditions.

In many cases, the seat adjuster of this fore-and-aft adjustment type is installed in pair under a seat cushion of the seat in a symmetrical fashion. Thus, it includes a pair of spaced-apart seat slide rails each comprising an upper rail member fixed to the seat cushion and a lower rail member fixedly secured on the floor of automobile, wherein the upper rail member is slidably fitted in the lower rail member so that the seat adjuster itself can be moved with the seat on and along the lower rail member. Such pair of seat adjusters, disposed on the right and left sides of or symmetrically relative to the bottom of seat cushion, are each provided with a lock mechanism for locking and unlocking the upper rail member to and from the lower rail member, to thereby allow an occupant on the seat to adjustably lock the seat at a desired position in the fore-and-aft direction thereof relative to the lower rail member fixed on the floor. In general, both two lock mechanisms are interlocked for synchronized operation to lock and unlock both pair of seat adjusters by means of an operation lever. Typically, the operation lever in that case are projected outwardly from the seat for direct access thereto by a hand of user, as disclosed for instance from the U.S. Pat. No. 6,036,267 which shows a generally "U" shaped operation lever projected forwardly of a seat cushion of so that the lever can be readily operated in vertical direction by an occupant on the seat for locking and unlocking of a seat adjuster described therein. According to this prior art, in brief, both ends of such generally "U" shaped operation lever are respectively connected with a pair of lock mechanisms for the seat adjuster, each of the lock mechanisms including a lock piece operatively disposed at an upper rail member and a series of lock holes formed in a lower rail member. Upward rotation of the lever causes disengagement of both lock pieces from the respective lock holes to release the seat adjust from a locked state to permit adjustment of seat in the fore-and-aft direction.

However, the hitherto operation levers of seat adjusters, including such U-shaped rod operation lever, are by and large projected and exposed from the seat cushion. In particular, the U-shaped operation lever of the foregoing prior art is projected and exposed forwardly of seat cushion. The exposure of operation lever has been found defective in impairing the outer aesthetic appearance of seat.

SUMMARY OF THE INVENTION

In view of the above-stated drawbacks, it is a primary purpose of the present invention to provide an improved seat adjustment device which avoids the need to use any projected operation lever so as to retain the original aesthetic appearance of seat.

In order to achieve such purpose, a seat adjustment device in accordance with the present invention is basically comprised of:

a lock mechanism for locking and unlocking a vehicle seat at a given position; and an operation lever means operatively connected with the lock mechanism, which operation lever means is pivotally arranged in a flap-like manner below a forward end of seat cushion of the seat such as to be normally dependent therefrom.

Accordingly, the operation lever means per se is disposed flash with the forward end wall of seat cushion, not projected from the seat, and looked as if it was an integral part of the seat.

Preferably, the operation lever means may be covered with an extension of a trim cover assembly associated with the seat cushion to enhance an integration with the seat.

In the case of the vehicle seat having a pair of side garnish covers adapted to cover respective two lateral areas thereof under the seat cushion, the operation lever means may be pivotally arranged below the forward end of seat cushion and between those two side garnish covers in a flap-like manner such as to be normally dependent from the forward end of seat cushion. In that aspect, the operation lever means may preferably be generally equal in height-wise width to such pair of side garnish covers, so that the former is viewed as if it was an integral part of the latter, and further, more preferably, the color and texture of operation lever means may be the same as those of the two side garnish covers.

Any other various features and advantages of the present invention will become apparent from reading of the descriptions hereinafter, with reference to the annexed drawings.

BRIEF DESCRIPTION OF THE DRAWINGS

FIG. 3 is a fragmentary sectional view of the seat adjuster and a seat cushion of the vehicle seat, which explanatorily shows the operative motions between the operation lever and associated elements of seat adjuster;

FIG. 4 is a fragmentary sectional view of the seat adjuster and seat cushion, which shows that the operation lever is covered with an extension of trim cover assembly associated with the seat cushion; and FIG. 5 is a partially broken perspective view of the vehicle seat, showing the mode of operation lever as in the FIG. 4.

DETAILED DESCRIPTION OF PREFERRED EMBODIMENT OF THE INVENTION

Figure 1:
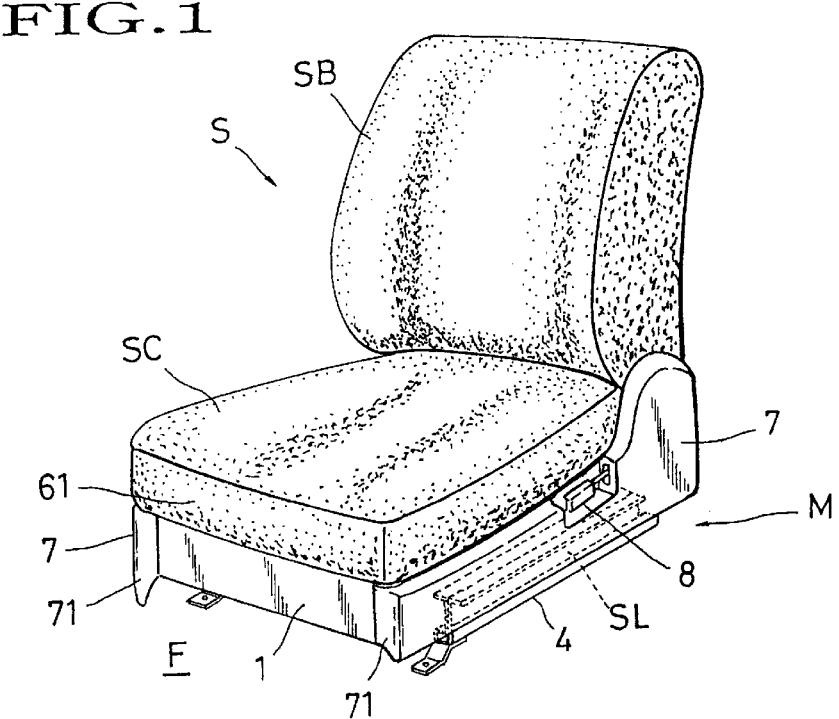
FIG. 1 is a schematic perspective view of a vehicle seat to which a seat adjustment device or seat adjuster of the present invention is applied, wherein an operation lever is shown as being of the same color and texture as those of two side garnish covers.

Referring to FIGS. 1 through 5, there is illustrated a seat adjuster generally designated by (M) in accordance with the present invention, by way of example, which is arranged in an automotive seat (S) composed of a seat cushion (SC) and a seat back (SB). The automotive seat (S) is of the type having a pair of side garnish cover members (7), each covering the respective two lower lateral regions thereof which lie beneath the seat cushion (SC) to give an improved aesthetic effect to the appearance of the seat. The side garnish cover members (7) are formed from a synthetic resin material. As with most of ordinary seat cushions, the seat cushion (SC) is composed of a foam cushion member (62) having a substantive predetermined shape of seat cushion, a trim cover assembly (61) covering the outer surfaces of the cushion member (62), and a seat cushion frame (63) provided in the bottom side of the foam cushion member (62), as seen from FIGS. 3. Designation (1) represents an operation lever of the seat adjuster (M), by which an occupant on the seat can activate a lock mechanism (5) into an unlocked state, thereby enabling adjustable movement of the seat (S) to a desired position in the fore-and-aft direction thereof. As is known, the seat adjuster (M) includes a pair of spaced-apart slide rails (SL) for allowing the fore-and-aft movement of seat (S), each of the slide rails comprising a stationary lower rail (4) fixed on the floor of automobile and a movable upper rail (3) slidably fitted in the lower rail (4), the movable upper rail (3) being fixedly connected to the seat cushion (SC). As shown in FIG. 4, each of the movable upper rails (3) is so formed by two plate members (3A) (3B) of channel cross-section as to have, defined therein, an upper horizontal securing portion (3D), a lower horizontal engagement portion (3E) and a vertical wall portion (3F), whereas the stationary lower rail (4) is formed generally in a cylindrical manner with a longitudinal slit (4S) and a hollow (4H) defined therein. The lower horizontal engagement portion (3E) of the movable upper rail (3) is slidably engaged within the hollow (4H) of lower rail (4) via the longitudinal slit (4S), and on the other hand, the upper horizontal securing portion (3D) of the same upper rail (3) is fixed to a bracket (63A) of seat cushion frame (63) (see FIG. 3).

Designation (5) denotes a lock mechanism provided in each of the slide rails (SL). Lock mechanism (5) is best shown in FIG. 3 as comprising: a lock plate (51) movably disposed in the vertical groove (3H) defined in the vertical wall portion (3F) of upper rail (3) such as to be movable vertically from and away from the lower rail (4); a plurality of lock holes (401) formed in the bottom wall of lower rail (4); and an actuator link (52) operatively connected via a wire (23) between the lock plate (51) and operation lever (1). Briefly, the arrangement of this lock mechanism is such that operating the lever (1) causes the lock plate (51) to move vertically for engagement into and disengagement from a selected one of the plural lock holes (401), to thereby permit for locking and unlocking of the upper rail (3) in the fore-and-aft direction with respect to the lower rail (4). The lock plate (51) has a pin (51P) formed in the upper end portion thereof, which pin (51P) is slidably engaged in an arcuate slit (52H) of actuator link (52). As shown, the actuator link (52) has a lower end portion in which such arcuate slit (52H) is formed, and an upper end portion connected to a wire (23). Wire (23) movably passes through a support plate (24) dependent fast from the seat cushion frame (63) and is extended between the actuator link (52) and operation lever (1). One end of wire (23) is connected to the upper end portion of actuator link (52), while another opposite end of the wire (23) connected to a lug (20) fixed on the inward reverse side of plate frame (13) of the operation lever (1). The arcuate slit (52H) serves to a make the actuator link (52) idle to a small degree in order to prevent direct transmission of inadvertent motion of the operation lever (1) to the lock plate (51).

In accordance with the present invention, there is provided a novel arrangement of the operation lever (1) in the seat adjuster (M). Namely, as can be seen from FIGS. 1 and 3, the operation lever (1) is generally embodied by a flap fashion dependent from the forward end of seat cushion (SC), so that an occupant on the seat (S) can grasp the lever (1) with his or her fingers and draw it in the direction forwardly of the seat (S) for unlocking purpose.

Figure 2:
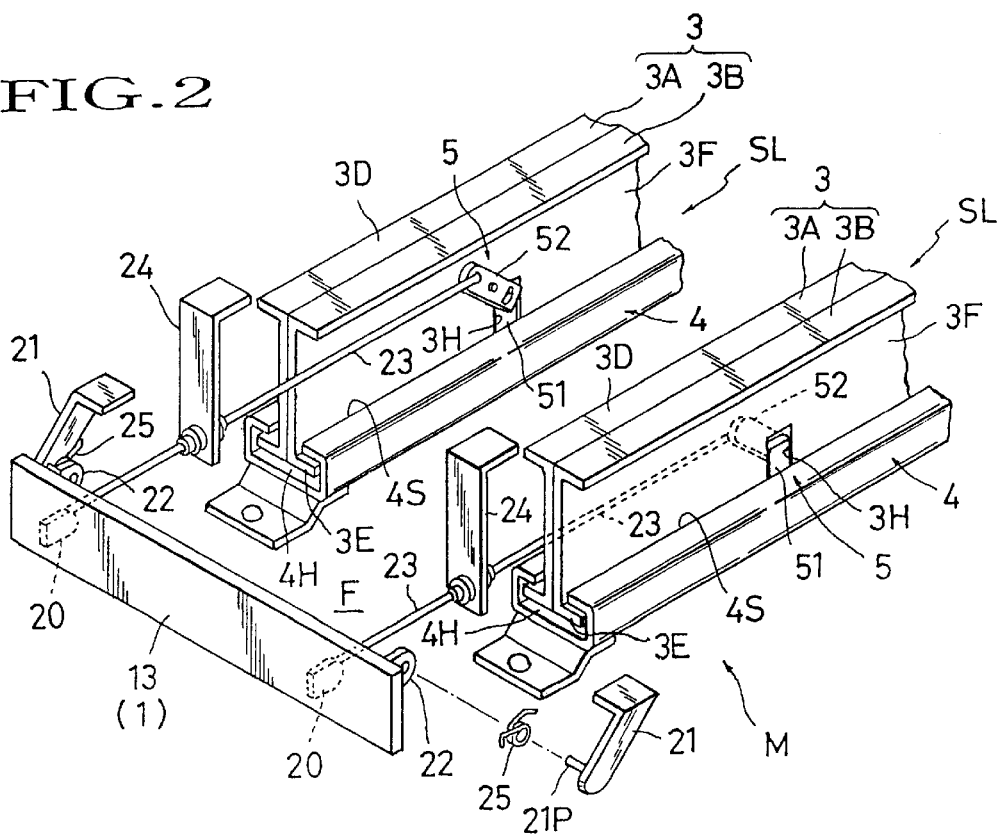
FIG. 2 is a partly broken and exploded schematic perspective view of the principal parts of the seat adjuster.

FIG. 2 shows a basic construction of the operation lever (1) adaptable for use at the forward end portion of seat cushion (SC). Specifically, as seen in FIG. 3, the operation lever (1) is formed by a plate frame (13) of a generally oblong shape, a foam padding (12) and a trim cover assembly (11) covering the entirety of those plate frame (13) and foam padding (12). The plate frame (13) has a pair of spaced-apart connecting brackets (22) (22) fixed on the reverse side thereof. The two brackets (22) are situated on the upper area of the reverse side of plate frame (13) and respectively located on the two opposite lateral end portions of the same frame (13). This plate frame (13) is rotatably connected via two return springs (25) to a pair of support brackets (21) (21) which are fixed on the bottom side of seat cushion frame (63) and dependent therefrom. In this respect, more specifically, each support bracket (21) has a pin (21P) formed at the lower end thereof. As understandable from FIG. 2, such pin (21P) is inserted in the respective holes of two connecting brackets (22) via each return coiled spring (25) and provided at its end with a nut or stopper means (not shown), whereupon the plate frame (13) is so connected to both two support brackets (21) as to be rotatable about the pins (21P) while being biased by the return coiled springs (25) to a vertical locked position as in FIG. 3. Namely, in that vertical locked position, the frame (13) is in the state of being dependent perpendicularly from the forward end of seat cushion (SC). For that purpose, the return spring (25) is best shown in FIG. 3 as being wound about the pin (21P), with its two ends being respectively engaged over the connecting and support brackets (22) (21), such as to resiliently bias the frame (13) to the vertical locked position. With this arrangement, when the operation lever (1) including that frame (13) is set in the vertical locked position, both wire (23) and actuator link (52) are retained in the inoperative position under the biasing force of return spring (25), thereby placing the lock plate (51) in the lowered position where the lower end potion of lock plate (51) is engaged in one of the plural lock holes (401), as shown in FIG. 3.

As commonly seen from FIGS. 1 and 5, the operation lever (1) is neatly disposed in an rectangular space defined by the bottom of seat cushion (SC) and the two vertical forward wall sections (71) respectively of the two side garnish covers (7), such that the plane frontal surface of the lever (1) is generally flush with both two side garnish cover forward wall sections (71). Preferably, the width-wise length of operation lever (1) be generally equal to the spacing between those two wall sections (71) of side garnish covers (7), whereas the vertical length of the former (1) be generally equal to the height-wise width of the latter (7). Hence, it is to be appreciated that the operation lever (1) does not protrude forwardly of the seat (S) as in the prior art and presents such integrated appearance as if the lever (1) formed one of the lower forward walls of the seat (S), thereby improving an outer aesthetic appearance of the seat. Further, the operation lever (1) itself is in the so-called "flap-like" state dependent from the forward end of seat (S), thus allowing an occupant on the seat to easily reach and grasp the lever (1) without seeing it, in comparison with the conventional U-shaped lever projected under the seat.

As suggested in FIG. 3, the operation lever (1) may be formed by laminating a foam padding layer (12) on the forward surface of the plate frame (13) and enclosing those two elements (12) (13) with a cover material (11). In this mode, the cover material (11) may be of the same synthetic resin material and the same color with those of the side garnish covers (7), to thereby offer such an improved aesthetic effect as if the lever (1) was integral with the side garnish covers (7).

Alternatively, as suggested in FIGS. 4 and 5, the operation lever (1) may be formed by enclosing both foam padding layer (12) and plate frame (13) with an extension (61E) of trim cover assembly (61). Namely, according to the present mode, a section of the trim cover assembly (61) which covers the forward end part of seat cushion (SC) is so formed to have the extension (61E) having a dimension sufficient to enclose both padding layer (12) and frame (13) therein. As shown in FIG. 4, a base part of such extension (61E) is sewn at (61 B) to one end of anchor piece (61A) at a point generally corresponding to the bottom side of seat cushion (SC), the anchor piece (61A) being preferably of a cloth material or a same material with that of the trim cover assembly (61) and being fixedly connected at another end thereof to the seat cushion frame (63). The whole rest of the extension (61E) is folded over both padding layer (12) and frame (13) to thereby cover them all substantially, with the extreme end thereof being securely attached as by adhesive or hog ring to the top of frame (13). Accordingly, it is seen that the whole outer appearance of operation lever (1) assumes the same color and texture with those of the seat cushion (SC) as if it was a part integral with the seat cushion.

In operation, as can be seen by the two-dot chain lines of FIG. 3, a user may grasp the operation lever (1) with his or her one hand and draw it forwardly as indicated by the arrow, overcoming the biasing force of return springs (25), which will cause the lever (1) to rotate about the pin (21P) and simultaneously draw the wire (23) in the same forward direction. These motions will result in the actuator link (52) being rotated about the pin (52P) in the anticlockwise arrow direction, to thereby raise the lock plate (51) out of engagement with one lock hole (401), whereupon the seat adjuster (M) is released from the locked state and the user can adjust the position of seat (S) at a desired point in the fore-and-aft direction. When releasing the operation lever (1) from the hand of user, the biasing force of return spring (25) causes the lever (1) to automatically return to the home position where it is dependent perpendicularly from the seat cushion (SC).

From the descriptions above, it is appreciated that the present invention offers the following advantages and effects:

1. The operation lever (1) is provided in a flap fashion dependent from the forward end of seat cushion (SC), thus serving as a decorative cover effective in concealing the lower forward area of seat cushion (SC). Accordingly, the seat adjuster (M) of the present invention renders the outer appearance of seat (S) improved more aesthetically than the conventional seat adjuster having an outwardly projected U-shaped lever.
2. The operation lever (1) has a center of rotation disposed at the upper point (i.e. at the pins (21)) thereof, which means that the lever (1) can be easily drawn with a small force, likewise as in the fulcrum effect. Thus, the unlocking operation is easy.
3. The outer appearance of operation lever (1) may be looked as it was integral with the seat (S) by upholstering the lever frame (13) with a material of the same color and texture with those of a selected one of the seat cushion (SC) and side garnish cover (7), whereby the lever (1) itself is viewed as an integral element of seat. The touch of the lever may be made soft in the case of using the same material as that of seat cushion, i.e. the trim cover assembly (61), or may be made hard in the case of using the same synthetic resin material as that of side garnish cover (7).

While having described the present invention, it should be understood that the invention is not limited to the illustrated embodiments, but any other modifications, replacements and additions may be applied thereto without departing from the scopes of the appended claims.

What is claimed is:

1. A seat adjustment device for adjusting a position of a vehicle seat in combination with the vehicle seat including a seat cushion having a forward end and a trim cover assembly affixed thereover, comprising:

a lock mechanism for locking and unlocking said vehicle seat at a given position; and an operation lever means having a plate shape which is operatively connected with said lock mechanism and is, at the upper end portion thereof, pivotally connected with said forward end of the seat cushion in such a manner as to be normally dependent therefrom and rotatable relative to said forward end in forward and backward directions of said seat cushion, said operation lever means being covered with an extension of said trim cover assembly;

wherein, by rotating said operation lever means in the forward direction of the seat cushion, said lock mechanism is actuated to unlock the vehicle seat.

2. The seat adjustment device as defined in claim 1, wherein a pair of brackets are firmly provided beneath said forward end of the seat cushion, and wherein said operation lever means is, at the upper end portion thereof, pivotally connected with said pair of brackets, so that said operation lever means is rotable relative to said pair of brackets in forward and backward directions of said seat cushion.

3. The seat adjustment device as defined in claim 1, wherein a biasing means is provided between said operation lever means and said locking mechanism to not only bias the operation lever means to a vertical position where it is normally dependent from the forward end of the seat cushion in a generally perpendicular relation therewith, but also biasingly cause the lock mechanism to set in a locked state to lock the vehicle seat against movement.

4. The seat adjustment device according to claim 1, wherein said operation lever means includes a plate frame, and an entirety of said plate frame is covered with said extension of the trim cover assembly, with a foam padding layer being interposed between said plate frame and said extension.

5. A seat adjustment device for adjusting a position of a vehicle seat in combination with the vehicle seat including a seat cushion having a forward end and a trim cover assembly affixed thereover, said vehicle seat being a type having a pair of side garnish covers adapted to cover respectively two lateral areas thereof under said seat cushion, comprising:

a lock mechanism for locking and unlocking said vehicle seat at a given position; and an operation lever means having a plate shape which is operatively connected with said lock mechanism and is, at the upper end portion thereof, pivotally connected with said forward end of the seat cushion in such a manner as to be normally dependent therefrom and rotatable relative to said forward end in forward and backward directions of said seat cushion, said operation lever means being covered with an extension of said trim cover assembly;

wherein, by rotating said operation lever means in the forward direction of the seat cushion, said lock mechanism is actuated to unlock the vehicle seat.

6. The seat adjustment device as defined in claim 5, wherein said operation lever means is generally equal in height-wise width to said pair of side garnish covers, so that the former is viewed to be an integral part of the latter.

7. The seat adjustment device according to claim 6, wherein said operation lever means is of same color and texture as those of said pair of side garnish covers.

8. The seat adjustment device as defined in claim 5, wherein a pair of brackets are firmly provided beneath said forward end of the seat cushion, and wherein said operation lever means is, at the upper end portion thereof, pivotally connected with said pair of brackets, so that said operation lever means is rotatable relative to said pair of brackets in forward and backward directions of said seat cushion.

9. The seat adjustment device as defined in claim 5, wherein a biasing means is provided between said operation lever means and said lock mechanism to not only bias the operation lever means to a vertical position where it is normally dependent from the forward end of the seat cushion in a generally perpendicular relation therewith and situated between said pair of side garnish covers, but also biasingly cause the lock mechanism to set in a locked state to lock the vehicle seat against movement.

10. The seat adjustment device according to claim 5, wherein said operation lever means includes a plate frame, and an entirety of said plate frame is covered with said extension of the trim cover assembly, with a foam padding layer being interposed between said plate frame and said extension.

* * * * *